United States Patent [19]
Bonnet

[11] Patent Number: 5,971,132
[45] Date of Patent: Oct. 26, 1999

[54] HIGH SPEED AUTOMATED COG SORTER

[75] Inventor: Henri Bonnet, Atlanta, Ga.

[73] Assignee: United Parcel Service of America, Inc., Atlanta, Ga.

[21] Appl. No.: 08/878,306

[22] Filed: Jun. 18, 1997

[51] Int. Cl.$^6$ ................................................. B65G 47/46
[52] U.S. Cl. ................................ 198/370.07; 198/370.08
[58] Field of Search ........................ 198/370.07, 370.08, 198/370.1, 371.2

[56] References Cited

U.S. PATENT DOCUMENTS

| | | |
|---|---|---|
| 1,729,671 | 10/1929 | Bell-Irving et al. . |
| 1,939,891 | 12/1933 | Glahn et al. ........................ 198/370.08 |
| 3,045,792 | 7/1962 | Greller ...................................... 193/36 |
| 3,104,755 | 9/1963 | Zuercher . |
| 3,231,068 | 1/1966 | Harrison et al. . |
| 3,232,417 | 7/1966 | Muller ..................................... 198/185 |
| 3,384,237 | 5/1968 | Leonard .............................. 198/370.08 |
| 3,429,417 | 2/1969 | Good et al. ................................ 198/31 |
| 3,592,325 | 7/1971 | Sullivan et al. ...................... 198/321.2 |
| 3,608,713 | 9/1971 | Crosby . |
| 3,710,923 | 1/1973 | Fromme et al. .................... 198/320.08 |
| 3,743,090 | 7/1973 | Brown et al. . |
| 3,926,298 | 12/1975 | Miller et al. . |
| 4,174,774 | 11/1979 | Bourgeois . |
| 4,200,178 | 4/1980 | Gunti ...................................... 198/372 |
| 4,364,465 | 12/1982 | Kraft et al. . |
| 4,369,873 | 1/1983 | Heuff .................................. 198/370.07 |
| 4,633,996 | 1/1987 | Waterhouse . |
| 4,711,357 | 12/1987 | Langenbeck et al. . |
| 4,732,260 | 3/1988 | Canziani . |
| 4,798,275 | 1/1989 | Leemkuil et al. . |
| 5,027,939 | 7/1991 | Kilper et al. . |
| 5,165,516 | 11/1992 | Reed et al. . |
| 5,430,282 | 7/1995 | Smith et al. . |
| 5,438,188 | 8/1995 | Surka . |
| 5,551,543 | 9/1996 | Mattingly et al. . |

FOREIGN PATENT DOCUMENTS

| | | |
|---|---|---|
| 0438667A2 | 7/1991 | European Pat. Off. . |
| 2387879 | 11/1978 | France . |
| 2940014 | 11/1980 | Germany . |

Primary Examiner—Joseph E. Valenza
Attorney, Agent, or Firm—Jones & Askew, LLP

[57] ABSTRACT

A conveyor sorter includes diverter stations having a plurality of spaced apart powered rollers mounted to carry the articles in the direction of the conveyor; a plurality of laterally movable post carriers, preferably endless belts, positioned alternately with the rollers. At least one post is mounted on each of the post carriers and extends upwardly therefrom. A controller is operative to move each of the post carriers to position the posts for engagement with articles traveling along the conveyor into the diverter station. The posts can be moved either to push articles off the conveyor or to form a stationary array to guide the articles off the conveyor.

30 Claims, 4 Drawing Sheets

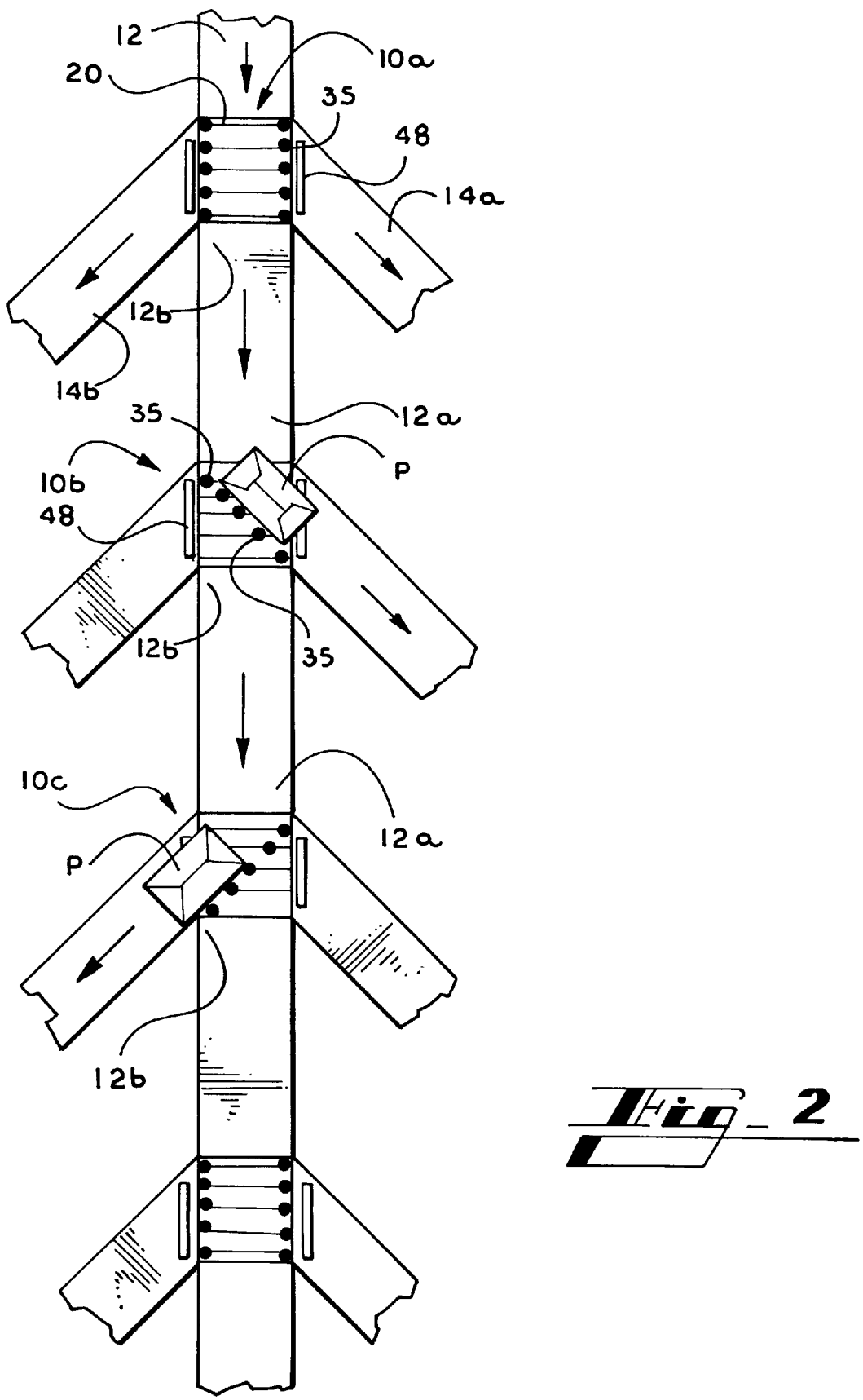
Fig_2

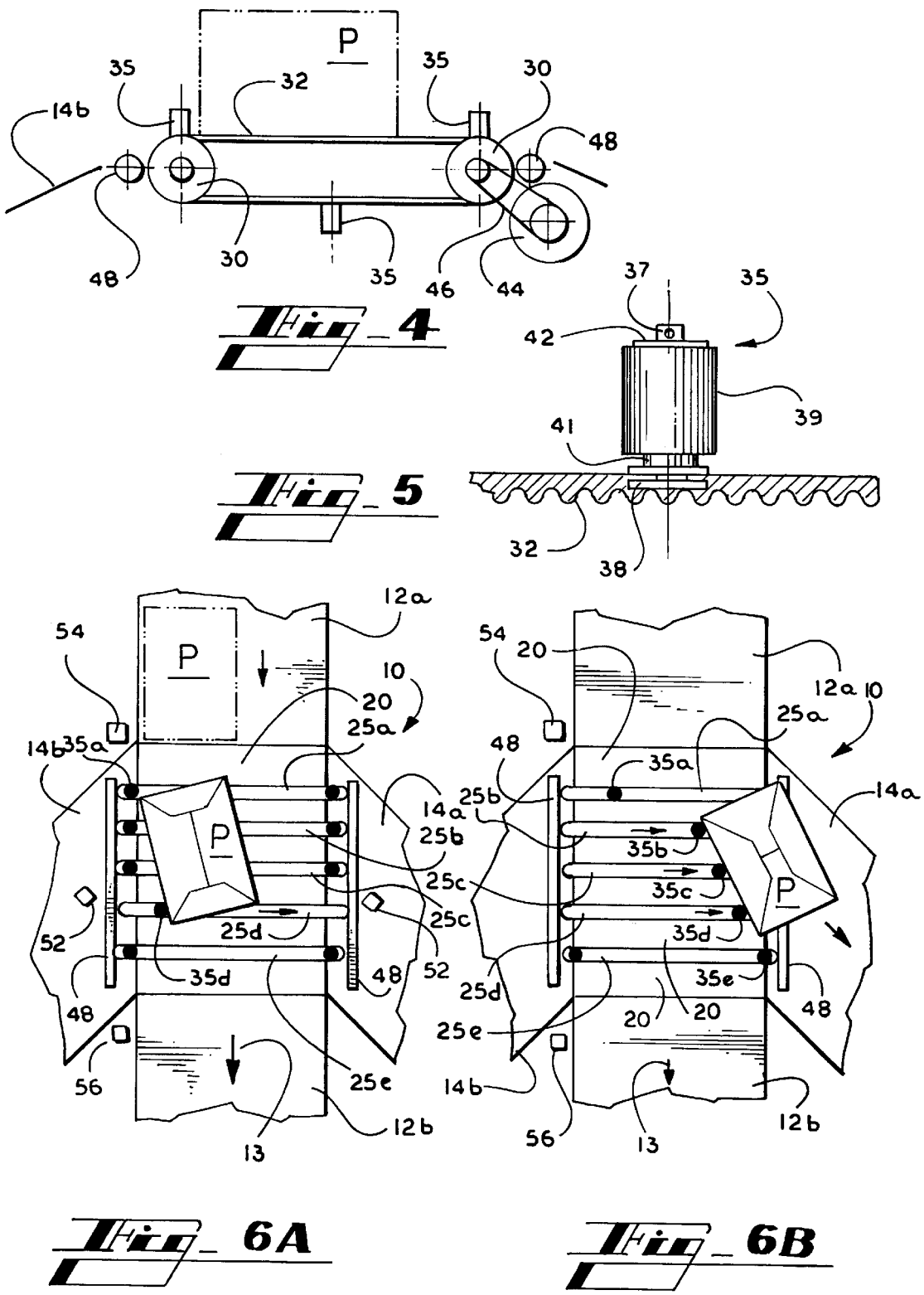

HIGH SPEED AUTOMATED COG SORTER

TECHNICAL FIELD

The present invention relates to a conveyor diverter for sorting articles, such as parcels, by diverting them off a conveyor into destination locations, and more particularly relates to such a conveyor sorter including diverter stations for diagonally diverting parcels at high speed to either side of the conveyor, or passing the articles straight through without diversion.

BACKGROUND ART

Package delivery companies pick up millions of packages daily from thousands of locations over a large geographical area and transport them to sorting facilities, primarily by truck and airplane, so they can be routed to a correspondingly large number of scattered destinations. To meet a rigorous schedule and provide accurate deliveries, a package delivery company must use automated transfer systems in the sorting facilities to match incoming packages with proper outgoing transport headed for the packages' destinations. Because deliveries are time sensitive, the sorting equipment must be very fast, yet provide gentle and accurate handling of packages.

Belt and roller conveyor systems have often been used in package sorting systems to move packages from incoming loading docks to outgoing transport. A initial sorting of packages traveling along a conveyor may be accomplished by diverting packages from the conveyor based on their destinations, or based on their size or another characteristic.

To automate handling of articles traveling on conveyor systems, conveyor diverter assemblies of various types have been developed. Roller bed diverters using right angle transfer belts are shown in U.S. Pat. Nos. 4,798,275, and 4,174,774. However, these diverter systems divert articles at right angles to the primary conveyor direction of travel. Therefore, a fast moving article must slow down so that the transfer belts may frictionally the article for the radical right angle change of direction. If the article is traveling at high speed, it may slide uncontrolled through the diverter and miss its intended path. Thus, this system sacrifices production speed for accuracy.

Other diverter systems have been developed to divert the articles diagonally from the main conveyor. U.S. Pat. No. 5,551,543 shows a sorter with angled rollers for this purpose. In one embodiment, the articles are either carried straight through on chains, or lowered onto diverting idler rollers while being pushed. In another version, steerable idler rollers guide the articles either straight or off to the side. In another version, the angled idler rollers are shifted up into contact with the articles. In a final version, there are two sets of idler wheels arranged at different angles, one of which is vertically movable. At any particular output location along the main conveyor path, the articles can only be diverted to one side of the path.

U.S. Pat. No. 3,608,713, has a main conveyor consisting of angled, powered rollers mounted to travel with a chain drive. If a parcel is to move straight with the conveyor, the rollers do not rotate. If the parcel is to be diverted, the powered rollers are activated to divert the parcel without slowing the chain drive. The apparatus only diverts in the direction the rollers are angled, and requires a complex mechanism to carry all the rollers with the chain conveyor.

U.S. Pat. No. 3,926,298, provides a main conveyor having multiple powered wheels, and a diagonal belt conveyor fitted between the wheels below the normal conveyor surface. A section of the drive rollers can be lowered to drop a parcel onto the belt conveyor, without interrupting the speed of articles moving along the primary path. However, the belt conveyor can divert in only one direction.

It is also known to provide slanted barriers over a moving conveyor to guide articles off the conveyor. These barriers may be stationary or may swing out over the conveyor to divert an article. In some such prior systems, the swinging diverters carry moving belts to assist in moving the article laterally, as shown in U.S. Pat. Nos. 1,729,671, 4,711,357, and 4,364,465. However, unless there are two swinging barriers, one swinging from each side of the conveyor, or one barrier pivoted at the center of the conveyor (severely limiting the size of articles that can pass it), the known slanted barriers cannot divert articles selectively off both sides of the conveyor at the same diverting location. Furthermore, prior systems cannot adjust the angle of the barrier while having it direct the article to exit at the same spot along the conveyor.

Other prior systems push articles off conveyors with pushing arms that sweep directly across the conveyors. Examples of such systems are shown in U.S. Pat. Nos. 3,026,988, 4,295,559, and 4,732,260. These systems either cannot turn a package as it is pushed off the conveyor, or require a complex articulating mechanism to move an article engaging member with the article.

U.S. Pat. No. 5,027,939 discloses a sorting conveyor in which the main conveyor is a bed of cross tubes carried by chains attached to either side of the tubes. A line of pusher units slide freely between adjacent pairs of the tubes under the guidance of cross-over tracks at each diverting location. A mechanism engages rollers extending down from the pusher units, which travel with the tubes, and guides them to the cross-over tracks when an article is to be pushed off the conveyor. The disadvantage of this system is that the pushers move both forward with the conveyor and across the conveyor, requiring a more complex conveyor mechanism. In addition, if a single pusher in the line becomes jammed at the entrance to the cross-over location, the entire conveyor may go down until a complex repair is performed.

U.S. Pat. No. 4,633,996 discloses a diagonal interceptor including an endless flexible member recessed slightly below the surface of a main conveyor, which is routed down and under the interceptor. The endless flexible member carries diverter plates that can be elevated to a position in which they deflect articles passing on the conveyor. This system requires a mechanism for raising and lowering the diverter plates.

Thus, there is a need in the art for a diverter that possesses greater flexibility in the manner and direction in which it discharges articles from a conveyor, does not travel with the conveyor, and is easy to repair.

SUMMARY OF THE INVENTION

The present invention seeks to provide an improved conveyor diverting system that does not travel with the conveyor and is capable of operating at high conveyor speed, carrying articles to either side of a conveyor or straight through the diverting location, operating in a pusher mode that allows control over the speed of the pushers and over rotation of the articles, and operating in a stationary barrier mode that provides a variable barrier angle without changing the discharge position.

In accordance with the invention, these objectives are accomplished by providing a system and method for transferring articles moving along a conveyor, including a diverter station, comprising: a plurality of spaced apart rollers mounted to carry the articles in the longitudinal direction of conveyor motion; a plurality of laterally movable post carriers positioned alternately with the rollers; at least one post mounted on each of the post carriers and extending upwardly therefrom; and a controller operative to move each of the post carriers to position the posts for engagement with articles traveling along the conveyor into the diverter station.

In one mode of operation, the controller operates to move at least two of the post carriers to engage posts with an article so as to push the article off the conveyor. Preferably, the post carriers are moved in sequence to engage and push the article in a controlled manner. For example, a downstream post may engage the article first to turn it, and subsequent posts then engage the article to control its orientation and assist in pushing it off the conveyor. The posts may be moved rapidly, push the article off the conveyor in less than one second. To avoid a harsh impact, the speed profile of the posts may be programmed, if desired, so that the posts move relatively slowly until the article is engaged, and then accelerate to push the article off the conveyor. Preferably, the controller is capable of pushing the articles to either side of the conveyor.

In the other mode of operation, the controller forms a diverting barrier by causing the post carriers to position each of the posts at selected locations across the path of articles moving along the conveyor into the diverter station. The diverting barrier, which may preferably be a diagonal line of stationary posts formed prior to the arrival of an article to be discharged from the conveyor, can be formed selectively to guide the article either to one side or to the other side of the conveyor.

In a preferred embodiment for either mode of operation, the post carriers are reversibly powered continuous loop belts, and the posts may be rollers mounted on axes extending outwardly from the continuous loop belts. Each belt may carry more than one post, to minimize the amount of belt travel needed to position a post at a desired location.

The controller preferably is operative to receive destination information for each article, and to operate the post carriers responsive to the destination information. An optical reader may be positioned to read destination information printed on a label on the articles.

The present invention also provides a method of transferring articles, comprising the steps of: conveying the articles in a primary direction into a diverting mechanism; driving the articles in the diverter station with a plurality of spaced apart rollers in the primary direction; moving a plurality of upstanding posts transverse to the primary direction in spaces between adjacent ones of the rollers, to position the posts for engagement with articles being driven by the rollers. In a preferred method, the step of moving the posts comprises pushing articles off the conveyor with the posts. In another aspect of the method, the step of moving the posts comprises forming an array of upstanding posts carried on laterally movable post carriers positioned alternately with the rollers; and guiding the articles off the conveyor with the posts. The method may further include the step of receiving destination information for each article, and may include selecting the manner of moving the posts in a controlled manner or to selected locations in response to the destination information.

BRIEF DESCRIPTION OF THE DRAWINGS

FIG. 2 shows a top diagrammatic view of a sorting system incorporating diverter stations embodying the present invention.

FIG. 4 is a cross sectional view of the diverter station, taken along line 4—4 of FIG. 1, showing a side view of a carrier belt assembly.

FIG. 5 is an enlarged side view of a post roller and its attachment to the belt carrier.

FIG. 6A is a diagrammatic view of the diverter station of FIG. 1 in the initial stage of operating in a pushing mode.

FIG. 6B is a diagrammatic view of the diverter station of FIG. 1 in the final stage of operating in a pushing mode.

DETAILED DESCRIPTION

Figure 1:
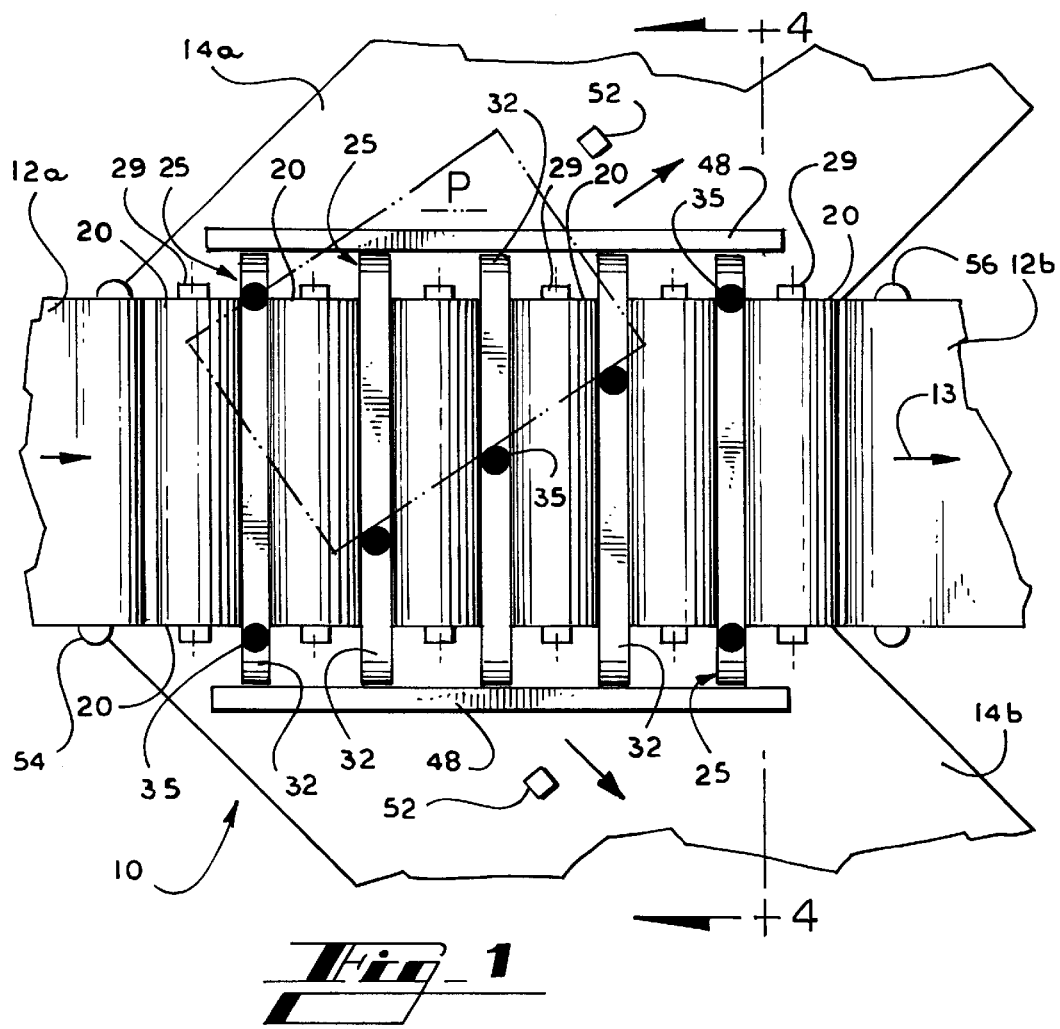
FIG. 1 shows a top plan view of a diverter station embodying the present invention.

Referring now in more detail to the drawings, in which like numerals refer to like parts throughout the several views, FIG. 1 shows a diverter station 10 embodying the present invention. One or more diverter stations 10 may be incorporated in a conveyor sorter 1 as shown in FIG. 2, between sections of a linear main conveyor 12. The main conveyor moves objects, such as parcels P, in the direction of arrows 13, referred to herein as the longitudinal or primary direction. Each diverter station 10 receives parcels P from an feed or input end 12a of a section of the conveyor 12, and discharges the parcel in one of three directions, namely, to the left into an output chute 14a, to the right into an output chute 14b, or straight through to a receiving or output end 12b of the next section of the conveyor 12. It will be understood that one or both of the output destinations 14a and 14b may be conveyors, receptacles, or the like, rather than chutes.

Figure 3:
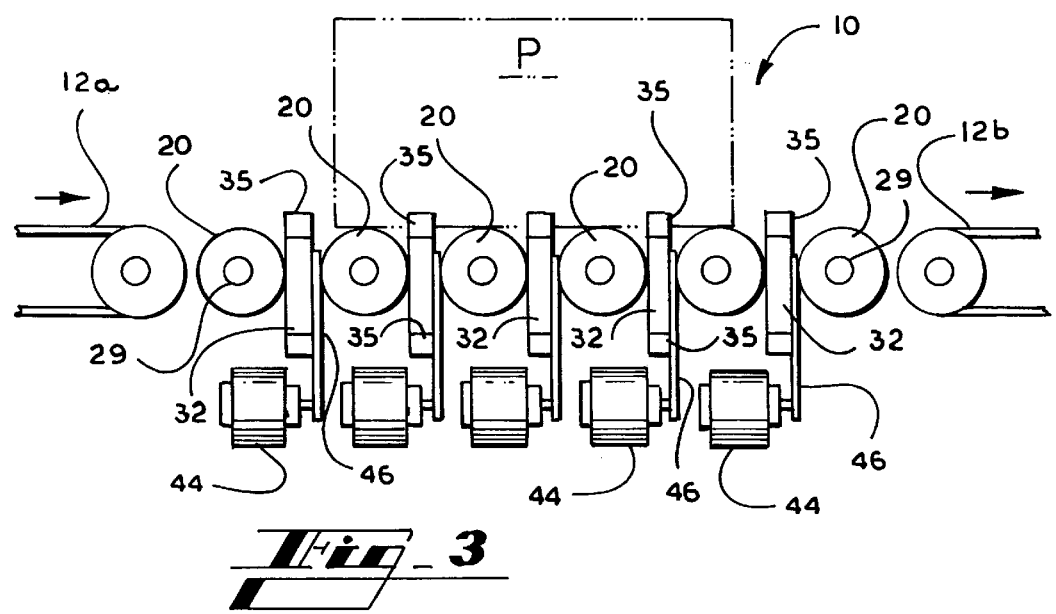
FIG. 3 is a side view of the diverter station of FIG. 1.

Each diverter station 10 includes a bank of live or powered rollers 20 rotated about roller shafts 29 by internal reversible motors (not shown) in a conventional manner. The roller shafts 29 are supported on bearings and a support structure (not shown). A space is left between adjacent rollers 20 to accommodate carrier belt assemblies 25, as best shown in FIGS. 1, 3, and 4.

Each carrier belt assembly 25 includes a pair of notched pulleys 30 around which passes a timing belt 32. The pulleys 30 are supported on bearings and a support structure (not shown). At least one, and preferably three to five, roller posts or cogs 35 extend outwardly from the outer surface of the timing belt 32. In the preferred embodiment, three such posts are spaced equidistant from one another around the timing belt. It should be understood that chains or another suitable continuous media could be used rather than timing belts.

The diameter of the rollers 20 determines how close together the posts 35 will be. When the posts are used to push parcels off the bed of rollers 20, the posts need not be exceedingly close together. For example, the rollers may be three inches (7.5 cm) or less in diameter and the centers of the posts therefore about four inches (10 cm) apart in the longitudinal direction. On the other hand, if the posts are positioned to form a stationary barrier for guiding parcels off the conveyor, the rollers 20 should be smaller, for example one inch (2.5 cm) in diameter, to place the posts 35 about two inches (5.1 cm) apart.

The rollers 20 preferably have a splined surface with the splines running axially along the rollers. The splines help to increase the friction between the rollers and parcels in the longitudinal direction. That is, the splines make the rollers more aggressive in moving the parcels down the conveyor. However, the splines reduce the friction of the parcels sliding transversely across the bed of rollers 20 toward the output chutes 14. The reduction in friction is the result of the decrease in surface area contact between the rollers and the parcels in the transverse direction.

The speed of the rollers 20 preferably is set so that the net forward speed of the parcels is not reduced as a result of their diversion. This may require a circumferential speed of the rollers 20 greater than the speed of the main conveyor 12, as the force exerted by the rollers may be divided into components with only a portion of the force contributing to longitudinal speed. Also, the rollers must not spin beneath the parcels. This may occur if the parcels are light and exert insufficient gravitational contact force on the rollers. Or, the rollers may not be able to overcome the inertia of heavy parcels traveling at a speed lower than the roller speed. The speed of the rollers may be accelerated from a speed slow enough to avoid spinning to a higher speed as the parcel moves through the diverter station, in a manner described below. The speed profile needed to maintain longitudinal parcel speed at about the speed of the conveyor 12 can be determined empirically depending on the size, weight, and surface characteristics of the parcels likely to be handled by the system.

In a preferred embodiment, the speed of each roller 20 may be individually controlled. In an alternative, the rollers 20 may be fitted with a common drive mechanism operated by a single motor. In this embodiment, the rollers 20 all operate at the same speed.

Referring to FIG. 5, each post 35 is attached to the timing belt 32 by a stud 37 defining a flange end 38 that is embedded into the material of the timing belt when the belt is made. A roller 39 of plastic, nylon, rubber, or some other suitable material is placed over the stud 37 after a bearing 41, and held onto the stud by a retainer 42 and a cotter pin or the like. Each carrier belt is driven by an individual servomotor 44 drivingly connected to one of the notched pulleys 30 by a belt 46, as shown in FIG. 4. The servomotors 44 preferably are reversible.

To ease the transition from the conveyor diverter station 10 to an exit chute 14, chute rollers 48 may optionally be mounted along the ends of the carrier belt assemblies, as shown in FIGS. 1, 2 and 4. The chute rollers may be idler rollers, in which case they reduce the friction experienced by a parcel leaving the diverter station. In the alternative, the chute rollers 48 may be powered rollers that draw the exiting parcels into the adjacent chute.

In each of the output chutes, 14a and 14b, an exit confirmation photocell 52 is positioned adjacent to where parcels leave the diverting rollers 20, as shown in FIG. 6A. Additional photocells 54 are positioned astride the input conveyor feed end 12a just upstream of the entrance to the diverter station 10, to indicate a parcel is entering the diverter station. Additional photocells 56 optionally can be positioned just downstream of the diverter stations 10 to provide a signal when parcels exit the diverter stations onto the receiving end 12b of the following section of the conveyor 12.

Figure 9:
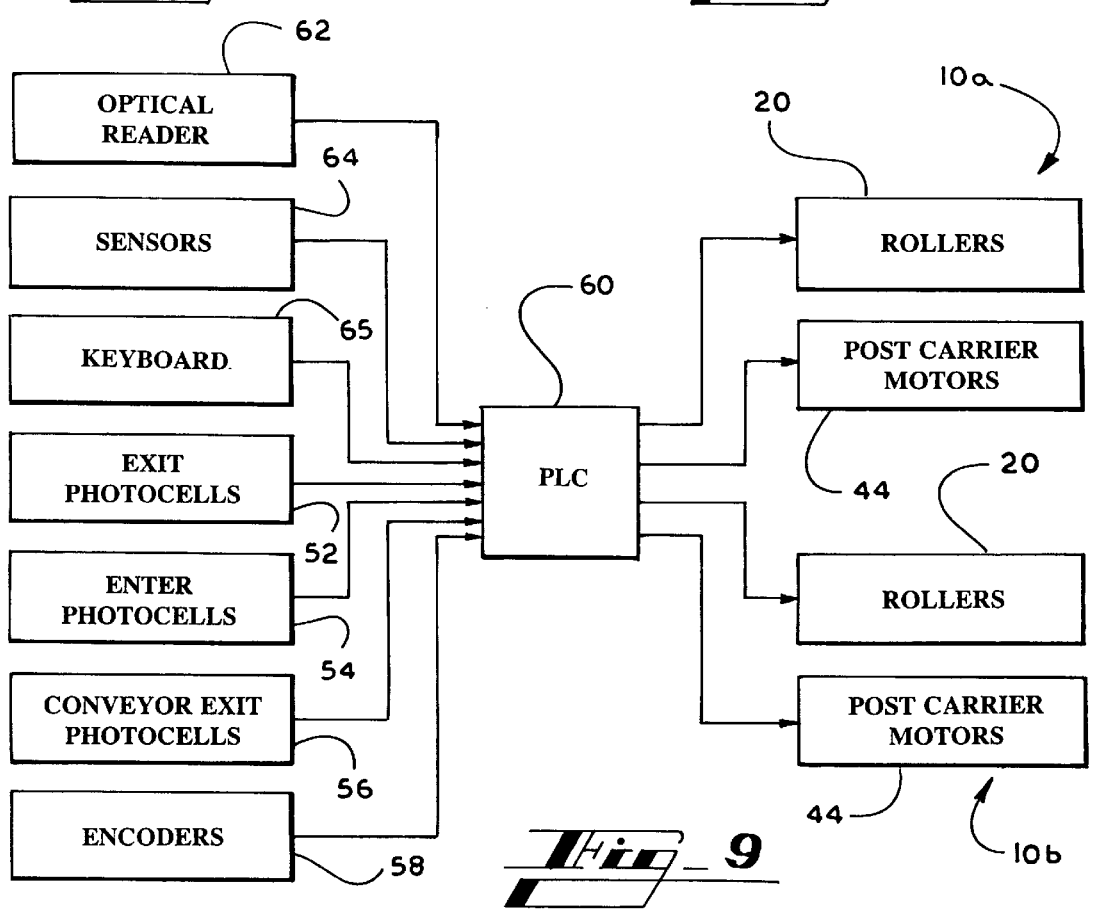
FIG. 9 is a block diagram of a control circuit for operating the diverter stations of a sorting system as shown in FIGS. 1–8.

Referring to the block diagram of FIG. 9, the operation of the diverter station 10 is automated through the use of a digital controller, such as a programmable logic controller 60 (PLC), or a general purpose computer, typically having an appropriate microprocessor. The PLC 60 may receive input signals from an optical reader 62 that reads barcode or two-dimensional symbols (such as MaxiCode symbols) on labels on the parcels P. Such a symbol may contain address information which allows the PLC to determine, in a well known manner, which output chute is the correct chute at which to discharge the parcel. The PLC 60 may also receive information about the parcel directly from sensors 64, such as a scale or a device for measuring the dimensions of the parcel. A set of rotary belt encoders 58 are positioned to measure the displacement of each section of the conveyor 12, and the output of these encoders is input to the PLC 60. Parcel information also may be manually entered at a keyboard 65. The PLC 60, in response to these input signals, sends control signals to each of the diverter stations individually, to operate the internal motors which rotate the rollers 20, and the servomotors 44 which drive the post carrier belts 32. Each roller 20 and each servomotor 44 may be individually controlled by the PLC 60 with appropriate programming.

In operation of a sorter system 1 incorporating a plurality of diverter stations 10, parcels P are placed on the conveyor 12. The PLC receives input from the rotary belt encoders 58 associated with the conveyor 12, and from the optical reader 62 or an alternative label reader or manual input device. The optical reader or other input device is used to acquire destination data about each package as the package is placed onto the sorting system. Any bar codes or other symbols on a parcel are detected and decoded. Destination information may be embedded in a dense code, or may be stored in a database location the address of which is contained in a bar code. Furthermore, textual address information on the parcel label can be analyzed using OCR techniques.

It should be understood that the present invention can utilize a feed mechanism, or the parcels can be placed manually onto the conveyor 12. Typically, the parcels will be aligned along one side of the conveyor 12, either by hand or by a known alignment mechanism.

When a package is imaged at the reader 62, the current count of the first encoder 58 is obtained. The rotary encoder device 58 allows the PLC to track how far the section of the conveyor 12 has traveled since any particular package was input onto that section. Furthermore, by monitoring which conveyor section the parcel has reached, the PLC can track the location of each parcel as it moves along the conveyor 12 and through diverter stations 10. More specifically, the photocells 54 inform the PLC when a parcel leaves a conveyor section and enters a diverter station. If the parcel is not scheduled for discharge from that station, the PLC receives a signal from a photocell 56 placed at the entry to the next conveyor section and triggered by the passing of the parcel.

A suitable optical reader system for imaging labels is shown in U.S. Pat. Nos. 5,291,564; 5,308,960; 5,327,171; and 5,430,282 which are incorporated herein by reference. Systems for locating and decoding bar codes and the MaxiCode dense code symbology are described in U.S. Pat. Nos. 4,874,936; 4,896,029; 5,438,188; 5,412,196; 5,412,197; 5,343,028; 5,352,878; 5,404,003; 5,384,451 and PCT Publication No. WO 95/34043.

A record for each package stored in the PLC memory may contain the parcel identification, destination address, and package characteristics. A description of the contents of the parcel, its dimensions and weight, or a code indicating the contents are fragile or hazardous or have some other special status, may be stored.

In the initial or default state of the sorting system, the diverter stations 10 are all set to send parcels straight through without diversion, that is, with the posts 35 positioned along the sides of the diverter stations, as shown at diverter station 10*a* of FIG. 2. In this configuration, the powered rollers 20 will drive the parcels straight through to the next conveyor section without obstruction by the posts.

Once the destination information for the package is known, the PLC 60 looks up in an appropriate part of its memory the proper output chute 14*a* or 14*b* corresponding to the package's destination, and the diverter station 10 associated with that output chute, as well as the identity of the conveyor section preceding that diverter station. Preferably, this information is stored in fields of the record already created for the package.

In a known manner, the PLC 60 determines when a parcel is approaching a diverter station 10 at which the parcel should be discharged. At such times, the PLC provides control signals instructing the motors 44 how to move the belts 32 to position the posts as needed. The PLC reads the encoder counts and photocell 54 signals as the parcel travels, and compares this position information to the discharge location information stored in memory. When the PLC receives signals indicating that the parcel has reached a conveyor section immediately preceding a diverter station 10 from which the parcel should be discharged, the PLC sends control signals to the post carrier servomotors 44 of that station. Optionally, the PLC may also send control signals to the motors of the rollers 20 based on the weight, size, or other information previously stored for the particular parcel to be discharged.

The belts 32 and posts 35 may operate in one of two principal modes of operation.

In one mode of operation, the diverter station 10 can operate to push parcels off the conveyor, as shown in FIGS. 6A and 6B. As shown in dashed lines in FIG. 6A, the parcel in this example is aligned along the side of the conveyor opposite the intended discharge chute 14*a*. The parcel will have triggered the photocell 56 at the receiving end 12*b* of the conveyor section on which the parcel is moving, and the parcel now triggers the photocell 54 as it exits the feed end 12*a*.

The posts 35 are initially stationary along the edges of the diverter section 10. Preferably, the rollers 20 are allowed to carry the parcel into the diverter station by a distance based on the length of the parcel. In this example, the PLC calculates a delay from the photocell 54 triggering, considering the speed of the rollers 20, and operates the servomotor 44 of the post carrier assembly 25*d* to move the post 35*d* into engagement with the side of the parcel near the leading edge of the parcel. The movement of the post 35*d*, on the fourth post carrier 25*d*, turns the leading edge of the parcel toward the output chute 14*a*. Immediately, the PLC moves the posts 35*c* and 35*b* into engagement with the side of the parcel and causes the three posts 35*b*, 35*c*, and 35*d* to move in unison to push the parcel off the rollers 20 and onto the chute roller 48, as shown in FIG. 6B. Preferably, the chute roller 48 is powered and is moving somewhat faster than the posts 35, so that it draws the parcel off the diverter station 10 into the output chute 14*a*.

In a preferred embodiment, the movement of the posts across the diverter station 10 occurs in less than one second, at speeds on the order of three to four feet per second (90 to 120 cm per second). The speed of the posts used as pushers may be varied depending on the size and weight of the parcel, if available from the sensors 64. Furthermore, the posts may engage the parcel slowly and then accelerate. This minimizes the impact of the posts on the parcel while moving the parcel off the conveyor at high speed. The PLC times the operation of the posts 35 so that the posts do not squeeze the parcel against the wall of the chute 14*a*.

It should be noted that in the example just described, the posts 35*a* and 35*e* played no part in pushing the parcel. However, the PLC moved the post carrier belt 32 of the carrier assembly 25*a* to remove a post from the path of the parcel, as shown in FIG. 6B. The PLC will utilize as many of the posts 35 as needed to move the parcel, depending on the parcel's length and weight, and will move idle posts from the path of the parcel.

If the parcel had been destined for the output chute 14*b*, the PLC would have operated the same post carrier belts 32 in the opposite direction, so that the posts lined up along the opposite side of the diverter station from the parcel would have pushed the parcel toward the output chute 14*b*. The PLC in this case accounts for the additional distance to be traveled before engaging the side of the parcel when calculating the time of post movements.

It should be noted that failure of one of the post carrier assemblies 25*b*, 25*c*, or 25*d* would not necessarily result in failure to divert the parcel. Furthermore, the post carrier assemblies 25 can be mounted on frames or slides (not shown) for easy removal from between the rollers 20. This can minimize down time for repairs by allowing a new assembly to be inserted quickly and used while the damaged assembly is repaired at leisure.

In a stationary barrier mode of operation, if the parcel must go to output chute 14*a*, then the PLC causes the belts 32 to move individually programmed distances until their posts 35 form a diagonal row as shown in FIG. 1 and at station 10*b* of FIG. 2. As noted, however, for this mode of operation more posts, positioned closer together than shown in FIG. 1, would be provided. To make the diagonal row, the post on the right hand side nearest the incoming parcel moves little or not at all. The successive posts are moved in from either side by programmed amounts to form the diagonal row. The rollers 20 move the parcel in the direction 13 of the conveyor, but as the parcel strikes the barrier of the row of posts, the parcel slides laterally as it rolls along the rollers 39 of the posts 35, until it falls from the conveyor diverter station into the output chute 14*a*. The rollers 39 assist in high speed operation by reducing the friction between the parcel and the barrier formed by the posts. If the chute roller 48 is present, the parcel will roll or be driven over the roller 48, depending on whether is it an idler roller or a powered roller.

Similarly, if the parcel must go to output chute 14*b*, on the right, then the PLC causes the belts 32 to move to form a diagonal line slanting in the other direction, as shown in station 10*c* of FIG. 2. It should be noted that placement of multiple posts 35 on each belt 32 along with the use of reversible motors 44 allows the required configuration to be reached with a minimum of time and movement.

In one method of operation, the first post may move out to turn the parcel and quickly return to the side of the diverter station. Then the side, rather than the leading corner, will impact the stationary row formed by the subsequent posts. This technique helps to prevent the corner from hanging up in between posts.

After a diverter station receives a series of command signals from the PLC and discharges a parcel, the state of the station may be retained until a change is needed.

Figures 7, 8:
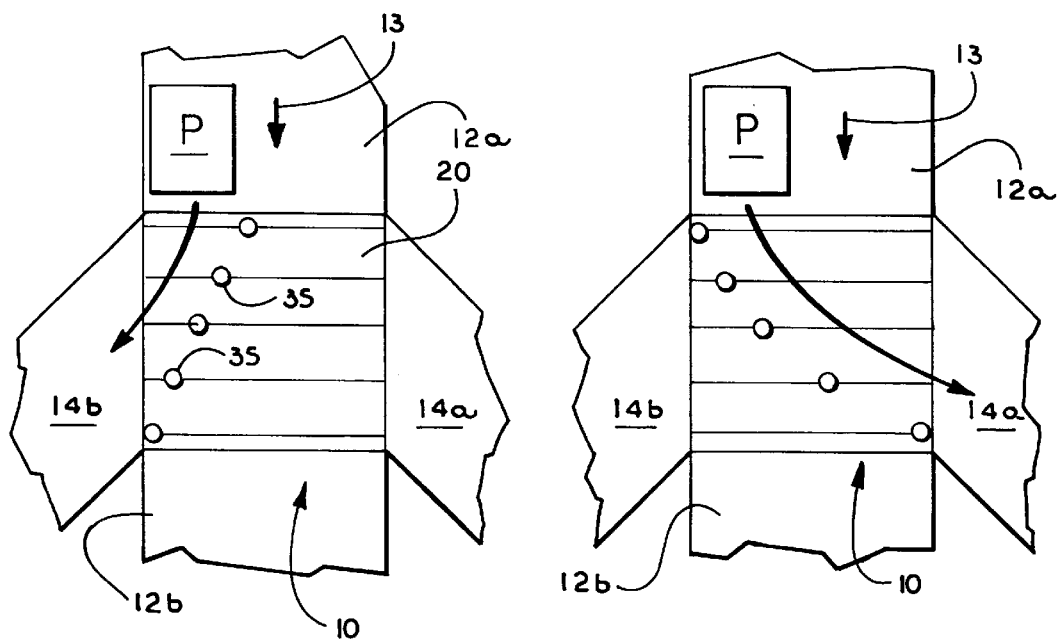
FIG. 7 is a diagrammatic view of the diverter station of FIG. 1 with the posts positioned as a straight stationary barrier.
FIG. 8 is a diagrammatic view of the diverter station of FIG. 1 with the posts positioned as a straight stationary barrier.

Under the control of the PLC, the posts 35 can be shaped to form any desired barrier. For example, the slope of the barrier can be altered without the restrictions that arise from having a barrier pivoted at a fixed point. In the case of parcels aligned against one edge of the conveyor, the barrier can be formed beginning closer to that edge if discharge is into the chute 14 along that edge, as shown in FIG. 7. But if the parcels must be moved all the way across to the opposite chute, a barrier consisting of a curved line of posts might be optimal, as shown in FIG. 8. Here, the parcels first experience a low impact, and a low lateral speed, which increases as the parcel moves through the diverter station. The number and size of the rollers 20 and the number of belt carrying assemblies 25 in each station 10 can be varied depending on the nature of the barriers needed.

Those skilled in the art will understand that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

In an alternative embodiment, not shown, the diverter stations may be positioned adjacent to one another without intervening conveyor belt sections. In this embodiment, the parcels move directly from one diverter station to the next until they are discharged, and one photocell 52 or 54 is positioned at the boundary between diverter stations.

From the foregoing, those skilled in the art will understand that a conveyor diverter system embodying the present invention is capable of operating at high speeds while discharging articles to either side of a conveyor or permitting straight through passage, depending on the article's intended destination as determined by information affixed to each article. Destination information may be viewed by optical readers and relayed to a programmed logic controller which in turn determines the configuration of the diverter stations of the system.

The diverter stations include individual belt and post assemblies, located alternatively between individually controlled powered rollers, none of which travel with a moving conveyor belt or the like. As such, the post assemblies can be instantly controlled for individual speed and position to push, turn and push, or form variable angle stationary barriers to direct an article toward an appropriate exit chute, where it may be assisted off the conveyor by an exit roller. Furthermore, the interchangeable nature of the assemblies permits rapid recovery in the event of failure because on-line maintenance is eliminated. Coordination of control of the post assemblies and the powered rollers permits reliable and safe handling of parcels at high speeds.

While this invention has been described in detail with particular reference to a preferred embodiment thereof, it will be understood that modifications and variations may be made without departing from the scope of the invention as defined in the appended claims.

I claim:

1. An article transferring apparatus, comprising:
    a conveyor positioned to carry articles in the direction of a longitudinal axis of said conveyor;
    said conveyor including a diverter station, comprising:
        a plurality of spaced apart rollers mounted for rotation about roller axes oriented such that said rollers carry said articles in the direction of said longitudinal axis;
        a plurality of laterally movable post carriers positioned alternately with said rollers;
        at least one post mounted on each of said post carriers and extending upwardly therefrom;
        said posts comprising rollers mounted on axes extending upward from said post carriers; and,
    a controller operative to move each of said post carriers to position said posts for engagement with articles traveling along said conveyor into said diverter station.

2. The apparatus of claim 1, wherein said post carriers comprise reversibly powered continuous loop belts.

3. The apparatus of claim 2, wherein said continuous loop belts carry a plurality of said posts spaced along said belts.

4. The apparatus of claim 1, wherein said controller is operative to receive destination information for each article, and to operate said post carriers responsive to said destination information.

5. The apparatus of claim 4, further comprising an optical reader in communication with said controller and positioned to read destination information affixed to said articles.

6. The apparatus of claim 1, wherein said controller is selectively operative to move said post carriers such that said posts form one of a plurality of diverting barriers that direct said articles laterally off a selected side of said diverter station.

7. The apparatus of claim 6, wherein said diverting barrier comprises a line of stationary posts formed prior to the arrival of an article to be discharged from said conveyor at said diverting station.

8. The apparatus of claim 7, wherein said diverting barrier comprises a diagonal line of stationary posts selectively formed to guide said article either to one side or to the other side of said conveyor.

9. The apparatus of claim 1, wherein said controller is individually connected to said post carriers, and is operative to move at least two of said post carriers to engage said posts with articles in a programmed sequence so as to push said articles in a controlled manner.

10. The apparatus of claim 9, wherein said controller is operative to engage a leading portion of an article with a downstream post and thereafter to engage a following portion of said article with an upstream post.

11. The apparatus of claim 9, wherein said controller is operative to accelerate said posts through a range of motion after said posts engage said articles.

12. The apparatus of claim 9, wherein said controller is operative to drive said posts at variable speeds.

13. The apparatus of claim 9, wherein said controller is selectively operative to drive said posts to laterally push said articles off a selected side of said diverter station.

14. An article transferring apparatus, comprising:
    a plurality of spaced apart rollers mounted for rotation about horizontal roller axes oriented such that said rollers carry said articles in a longitudinal direction;
    a plurality of laterally movable post carriers positioned alternately with said rollers, said post carriers including reversibly powered continuous loop belts;
    at least one post mounted on each of said continuous loop belts, said posts comprising rollers mounted on axes extending outward from said post carriers;
    an optical reader positioned to read destination information affixed to said articles; and, a controller, in communication with said optical reader, configured to operate said post carriers at variable speeds responsive to said destination information, and selectively operative to either move each of said posts to form a stationary diverting array which directs said articles off said diverter station or to move each of said posts in a programmed sequence so as to engage and push said articles off said diverter station in a controlled manner.

15. An article transferring apparatus, comprising:

a conveyor positioned to carry articles in the direction of a longitudinal axis of said conveyor;

said conveyor including a diverter mechanism, comprising:
   a plurality of spaced apart rollers mounted for rotation about roller axes oriented such that said rollers carry said articles in the direction of said longitudinal axis;
   a plurality of laterally movable post carriers positioned alternately with said rollers;
   at least one post mounted on each of said post carriers, said posts comprising rollers mounted on axes extending outward from said post carriers; and,
   a controller selectively operative to drive said post carriers such that said posts form one of a plurality of diverting arrays that direct said articles laterally off a selected side of said diverter mechanism.

16. A method of sorting articles, comprising the steps of:

directing said articles in a longitudinal direction along a conveyor into at least one diverting mechanism;

capturing a characteristic of said articles;

conveying said articles in said diverting mechanism, with a plurality of spaced apart rollers, in said longitudinal direction;

in response to said characteristic, determining one of a plurality of diverting modes and one of a plurality of operative configurations for a plurality of upwardly extending posts mounted to a plurality of respective post carriers located within the spaces between said rollers, each of said post carriers being separately moveable to position said respective posts along a lateral path extending across the entire width of said conveyor; and diverting an article to be discharged off one side or the other of said conveyor by moving each of said posts along its respective path in accordance with said diverting mode and said operative configuration.

17. The method of claim 16, wherein said mode comprises using a controller to selectively position said posts to form an operative configuration comprising a stationary diverting array which directs an article to be discharged off said conveyor.

18. The method of claim 17, wherein said stationary diverting array is a diagonal alignment of said posts.

19. The method of claim 17, wherein said stationary diverting array is a curved alignment of said posts.

20. The method of claim 16, wherein said mode comprises using a controller to selectively position said posts to form a moving operative configuration which engages and pushes an article to be discharged off said conveyor.

21. The method of claim 16, wherein said moving operative configuration is a longitudinal alignment of said posts.

22. The method of claim 16, wherein said moving operative configuration is a diagonal alignment of said posts.

23. The method of claim 16, wherein each of said post carriers are independent of each other, in communication with said controller, reversible in direction, and of variable speed.

24. An article transferring apparatus, comprising:

a conveyor positioned to carry articles in a longitudinal direction into at least one diverting mechanism;

said diverting mechanism, comprising:
   a plurality of spaced apart rollers mounted for rotation about horizontal roller axes oriented such that said rollers carry said articles in said longitudinal direction;
   a plurality of laterally moveable post carriers positioned alternately with said rollers, wherein said post carriers are individually driven; and,
   at least one upwardly extending post is mounted on each of said post carriers; and,
   a controller configured to selectively operate said post carriers in the following modes:
     to form one of a plurality of stationary diverting arrays from said posts that directs articles to be discharged off a selected side of said diverting mechanism; and
     to operate said post carriers to move said posts across an entire width of said conveyor so as to engage and push said articles off said diverter station in a controller manner.

25. The apparatus of claim 24, wherein said post carriers are reversible in direction.

26. The apparatus of claim 24, wherein said post carriers are of variable speed.

27. The apparatus of claim 24, wherein said stationary array comprises a diagonal alignment of posts.

28. The apparatus of claim 24, wherein said stationary array comprises a curved alignment of posts.

29. The apparatus of claim 24, wherein said post carriers move said posts to engage and push said articles in a programmed sequence.

30. The apparatus of claim 24, wherein said post carriers move said posts to form an array, and then move said array to engage and push said articles.

* * * * *